(12) United States Patent
Duguet et al.

(10) Patent No.: US 7,963,591 B2
(45) Date of Patent: Jun. 21, 2011

(54) CONNECTION BETWEEN THE ROOF CROSS-MEMBER AND THE UPPER CENTER PILLAR REINFORCEMENT OF A MOTOR VEHICLE

(75) Inventors: Eric Duguet, Paris (FR); Julien Janot, Courbevoie (FR)

(73) Assignee: Renault S.A.S., Boulogne (FR)

( * ) Notice: Subject to any disclaimer, the term of this patent is extended or adjusted under 35 U.S.C. 154(b) by 308 days.

(21) Appl. No.: 12/300,866

(22) PCT Filed: Mar. 16, 2007

(86) PCT No.: PCT/FR2007/050936
§ 371 (c)(1),
(2), (4) Date: Nov. 14, 2008

(87) PCT Pub. No.: WO2007/135302
PCT Pub. Date: Nov. 29, 2007

(65) Prior Publication Data
US 2009/0174228 A1   Jul. 9, 2009

(30) Foreign Application Priority Data

May 18, 2006   (FR) ...................................... 06 51814

(51) Int. Cl.
*B62D 27/02* (2006.01)
(52) U.S. Cl. .................................................. 296/203.03
(58) Field of Classification Search ............. 296/193.06, 296/203.03, 203.01, 187.03, 187.12, 29, 296/30, 205, 210, 214
See application file for complete search history.

(56) References Cited

U.S. PATENT DOCUMENTS

| | | | |
|---|---|---|---|
| 5,873,618 A * | 2/1999 | Ejima | 296/30 |
| 6,073,992 A | 6/2000 | Yamauchi et al. | |
| 6,254,174 B1 * | 7/2001 | Wee | 296/203.04 |
| 6,322,135 B1 | 11/2001 | Okana et al. | |
| 6,328,376 B2 * | 12/2001 | Son | 296/203.03 |
| 7,121,615 B2 * | 10/2006 | Hoshino | 296/203.03 |
| 7,165,806 B2 * | 1/2007 | Osterberg et al. | 296/203.03 |
| 7,213,874 B2 * | 5/2007 | Osterberg et al. | 296/210 |
| 7,293,823 B2 * | 11/2007 | Chen et al. | 296/203.03 |
| 7,357,448 B2 * | 4/2008 | Chen et al. | 296/203.03 |
| 7,407,222 B2 * | 8/2008 | Anderson et al. | 296/193.06 |
| 7,431,378 B2 * | 10/2008 | Chen et al. | 296/102 |
| 7,810,871 B2 * | 10/2010 | Matsui | 296/187.12 |
| 7,828,357 B2 * | 11/2010 | Hayashi et al. | 296/29 |
| 2006/0055209 A1 | 3/2006 | Hoshino | |

FOREIGN PATENT DOCUMENTS

| | | |
|---|---|---|
| DE | 10 2005 043062 | 3/2006 |
| EP | 0 856 455 | 8/1998 |
| EP | 1 024 073 | 8/2000 |

\* cited by examiner

*Primary Examiner* — H Gutman
(74) *Attorney, Agent, or Firm* — Oblon, Spivak, McClelland, Maier & Neustadt, L.L.P.

(57) ABSTRACT

A connection between an upper center pillar reinforcement and a roof cross-member allows providing a body with a high degree of mechanical resistance, in particular with respect to lateral impacts to a vehicle. The connection makes use primarily of a window post liner situated behind the upper center pillar reinforcement. The liner includes a tab intended to overlap the reinforcement in a connecting area and where it is covered by the end of the roof cross-member. A first series of weld points between the roof cross-member and the window post liner provides the connection between these two parts, while a second series of weld points provides the connection between the upper center pillar reinforcement and the window post liner, which is made of a different material from that forming the two other parts, to produce high-efficiency weld points.

8 Claims, 3 Drawing Sheets

CONNECTION BETWEEN THE ROOF CROSS-MEMBER AND THE UPPER CENTER PILLAR REINFORCEMENT OF A MOTOR VEHICLE

FIELD OF THE INVENTION

The invention relates to motor vehicles of the passenger car type whose bodywork has at least one roof cross-member in the middle of the roof joined to two center pillar top braces between two side doors of the vehicle.

It relates more particularly to the mechanical strength of the bodywork and indirectly the safety of the vehicle's passenger.

PRIOR ART AND PROBLEM POSED

The bodywork, or body shell, of normal types of vehicle, such as saloons, designed for private use, usually comprises, on either side of the vehicle, a central body shell side upright, situated between a front door and a rear door of the vehicle. This element joins the roof elements, in particular a roof cross-member and a top side structure, situated above the two doors, on each side of the vehicle, and if necessary called a "side roof rail".

Figure 1:
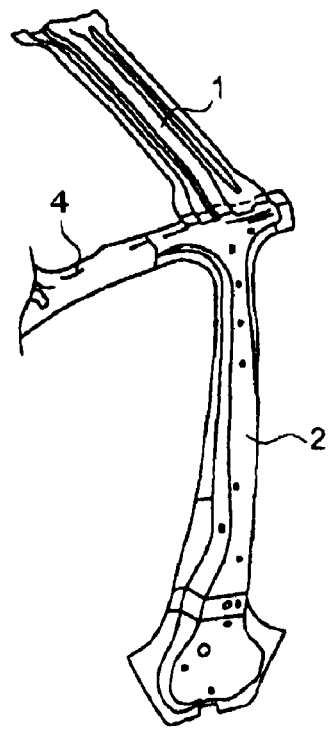

FIG. 1 shows these main elements and their junctions. So, the roof cross-member 1 is therefore attached, on the one hand, to the side upright of the body shell, and more exactly to the center pillar top brace 2, and to the side roof rail 4. In addition, it should be noted that, not shown in FIG. 1, there is a window post liner which is mainly behind the center pillar top brace 2 and partly behind the side roof rail 4.

One of the constant concerns of motor vehicle bodywork manufacturers is to provide the latter with an optimal mechanical strength against impacts, notably, against side impacts sustained by the bodywork at the side uprights, between the two front and rear doors, on one and the same side of the vehicle. For this purpose, the connection of the roof cross-member 1 with each of the two side pillars, in particular the center pillar top braces that are associated therewith, is crucial with respect to these characteristics of strength against side impacts. Specifically, this mechanical node must make it possible to carry considerable forces, approximately two tonnes, from the center pillar top brace 2 to the roof cross-member 1, hence the necessity to provide a faultless connection quality, notably concerning the spot welds. The mechanical node that this connection forms is therefore the subject of much mechanical strength research.

Furthermore, in most cases, the materials constituting respectively the roof cross-member 1 and the center pillar top brace 2 are very often the same or substantially the same, and for example a steel such as 22MMB5, that is to say with a high elastic limit. Specifically, these two parts must be provided with a very high elastic limit, of the order of 1200 MPa and must be attached very rigidly, for example by welding. Motor vehicle manufacturers have great difficulty welding together two parts made of such a very high elastic limit steel.

The object of the invention is therefore to remedy this disadvantage, by proposing a type of connection that makes it possible to attach together these two parts made of one and the same high mechanical strength metal.

SUMMARY OF THE INVENTION

Accordingly, the main subject of the invention is a connection between the roof cross-member and the center pillar top brace of the body shell of a motor vehicle of the saloon type, comprising:

a center pillar top brace placed substantially vertically and laterally in the body shell and consisting of a first determined material;

a roof cross-member placed substantially horizontally and transversely in the top portion of the body shell, consisting of one and the same second determined material and having to be attached, at each end, to the top portion of each center pillar top brace, in a rigid manner; and a window post liner placed on the inside of the center pillar top brace and consisting of a third determined material.

According to the invention, the fastening of the roof cross-member to the center pillar top brace is carried out by means of the window post liner by a series of first spot welds between the roof cross-member and the window post liner and by a series of second spot welds between the window post liner and the center pillar top brace.

In the envisaged embodiment of the invention, the first and second determined materials are very high elastic limit steels of the type similar to 22MMB5.

In this same preferred embodiment of the invention, the third determined material is another high elastic limit steel, but different from the first and second determined materials.

In the preferred embodiment of the connection according to the invention, the latter has a tongue designed to partially cover a connection zone of the center pillar top brace, so as to be covered by the roof cross-member.

In this case, the series of first spot welds is situated on either side of the tongue, the window post liner being behind the center pillar top brace.

Preferably, the series of second spot welds is produced in the location where the tongue covers the center pillar top brace.

Preferably, to allow the window post liner to be able to be inserted via its tongue between the roof cross-member and the center pillar top brace, the latter has a recess.

LIST OF FIGURES

Figure 2:
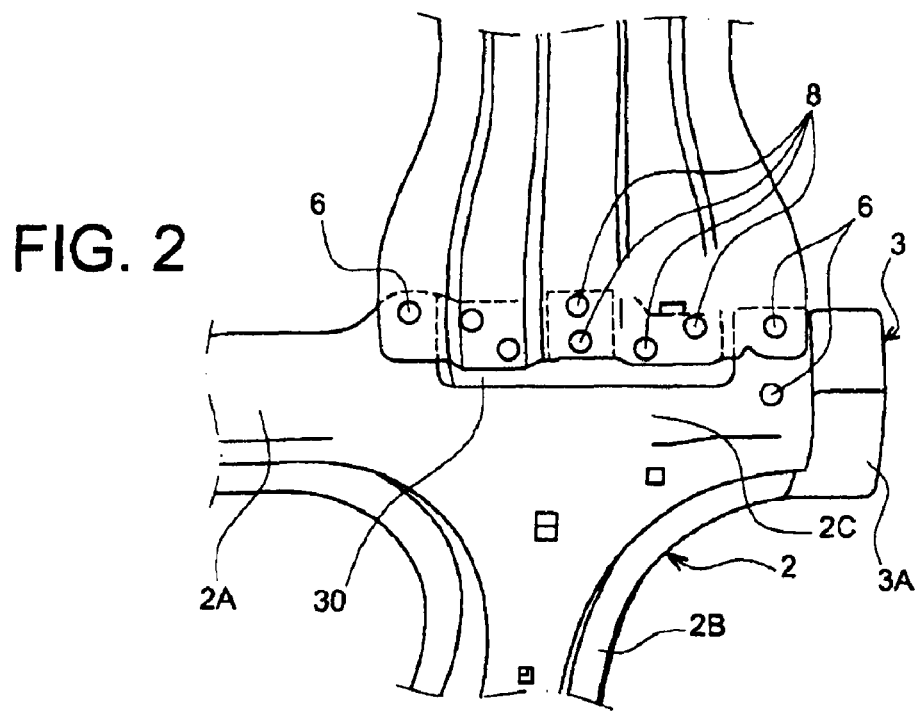
Figure 3:
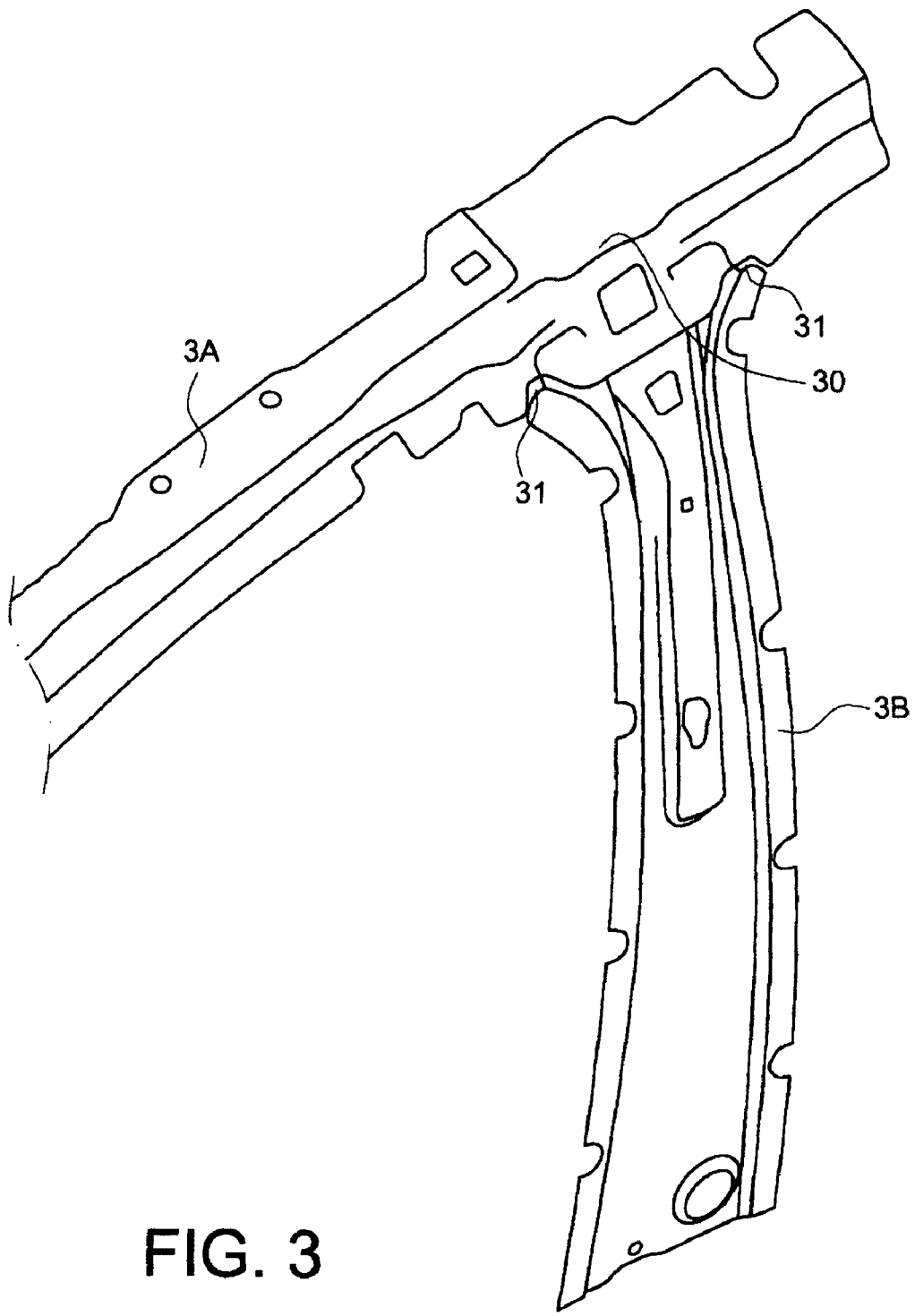
Figure 4:
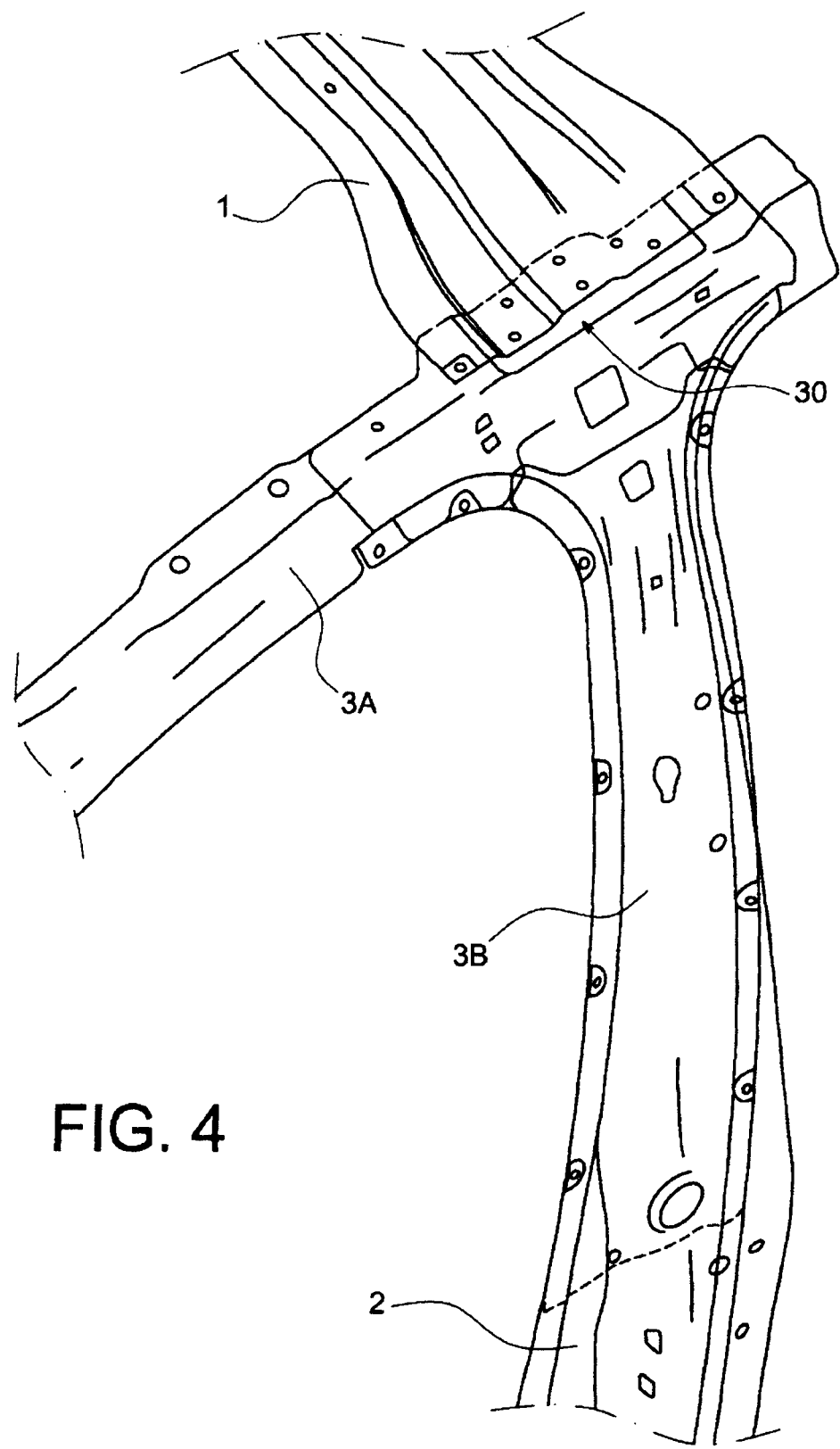

The invention and its various technical features will be better understood on reading the following description, accompanied by four figures representing respectively:

FIG. 1, the location of the connection according to the invention in a motor vehicle body shell; and FIG. 2, the details of the connection according to the invention;

FIG. 3, the window post liner used in the connection according to the invention; and FIG. 4, all the various parts mounted in the connection according to the invention.

DETAILED DESCRIPTION OF AN EMBODIMENT OF THE INVENTION

FIG. 2 shows in detail the mechanical node consisting of the connection of the center pillar top brace 2 with the roof cross-member 1, by means of the window post liner 3.

The center pillar top brace 2 has been shown with a horizontal portion 2A, extending longitudinally relative to the axis of the vehicle, along a side roof rail. Its bottom portion 2B, substantially vertical, extends between the two doors on one and the same side of the vehicle. The connection of these two portions constitutes a junction zone 2C on which the connection with the roof cross-member 1 is made.

This roof cross-member 1 is represented so as to cover a top portion of the junction zone 2C of the two portions, the horizontal portion 2A and the vertical portion 2B, of the center pillar top brace 2. Furthermore, the window post liner 3 is represented by a straight side portion 3A and is placed beneath the center pillar top brace 2, which explains the fact that it is not very evident in this FIG. 2. Nevertheless, a tongue 30 covering a top portion of the junction zone 2C and of the center pillar top brace 2 overlaps the end of the roof cross-member 1. In fact, this tongue 30 is placed between the roof cross-member 1 and the center pillar top brace 2. This tongue is therefore a portion separated from the metal sheet forming the window post liner.

A series of first spot welds 6, in this instance three spot welds in this figure, is made, on either side of the tongue 30, in the periphery of the junction zone 2C, between the window post liner 3 and this junction zone 2C of the center pillar top brace 2. In this FIG. 2, two of these first spot welds 6 are shown on the roof cross-member 1, but in fact form a weld between the center pillar top brace 2 and the window post liner 3. Specifically, the latter is, apart from the tongue 30, behind the center pillar top brace 2 and is therefore not visible in this FIG. 2. On the other hand, two of these first spot welds 6 are covered by the end of the roof cross-member 1. This series of first spot welds 6 therefore provides the mechanical connection between the center pillar top brace 2 with the window post liner 3.

A series of second spot welds 8, in this instance six spot welds in this FIG. 2, is made between the roof cross-member 1 and the window post liner 3. They are grouped together in the location where the tongue 30 covers the top portion of the junction zone 2C of the center pillar top brace 2. They therefore provide the mechanical connection between the roof cross-member 1, the window post liner 3 and this center pillar top brace 2.

Therefore, by means of the window post liner 3, and more particularly its tongue 30, an intermediate part is used consisting of a material different from the material forming the roof cross-member 1 and the center pillar top brace 2 in order to carry the forces through the spot welds 6 and 8 that are of satisfactory quality, because of the two different materials used, namely, in the recommended embodiment of the connection according to the invention, a very high elastic limit steel, of the 22MMB5 type and another high elastic limit steel. Specifically, the window post liner is made of another high elastic limit steel, but substantially different from that used and consisting of two other parts, in order to produce an effective weld.

Therefore the spot welds 6 and 8 satisfy the condition of non-breakage in the event of impacts. In addition, the "peeling" phenomenon is limited and possibly relates only to two of the second spot welds 8. This connection is therefore robust, even in the case of the least favorable side impacts.

FIG. 3 shows in detail the window post liner 3 which is made, in the embodiment described here, in two parts: namely a top and horizontal window post liner 3A and a vertical window post liner 3B. The top and horizontal window post liner 3A is behind the basic top longitudinal stringer of the vehicle, that is to say the side roof rail, while the vertical portion 3B is behind the center pillar. The central portion of the horizontal portion 3A comprises the tongue 30 which forms a slight protrusion relative to the overall section of the horizontal portion 3A of this horizontal window post liner. In this manner, the tongue 30 protrudes slightly and makes it possible to partially cover the center pillar top brace 2, in its junction zone, referenced 2C in FIG. 2. Note that the center pillar top brace 2 must have a slight recess in order to allow this tongue to be housed above this junction zone. Two side notches 31 make it possible to constitute the tongue 30 in the general section of the horizontal portion 3A of the window post liner 3.

FIG. 4 shows the whole connection, once produced. In this FIG. 4, the window post liner 3, in fact made of its horizontal portion 3A and its vertical portion 3B, is in superposition with the center pillar brace 2, which covers it, except at the tongue 30. The roof cross-member 1 partially covers the junction zone 30 of the main brace of the center pillar 2.

The invention claimed is:

1. A connection between a roof cross-member and a center pillar top brace of a body shell of a motor vehicle, comprising:
    the center pillar top brace placed substantially vertically and laterally relative to the body shell of the vehicle and including a first determined material, the center pillar top brace including a first side facing an inside of the motor vehicle and a second side facing an outside of the motor vehicle;
    the roof cross-member placed substantially horizontally and transversely in a top portion of the body shell, and including a second determined material, and being fastened rigidly to a top portion of the center pillar top brace; and
    a window post liner placed on the first side of the center pillar top brace and including a third determined material, the window post liner including a tongue configured to partially cover the second side of the center pillar top brace and to be covered by an end of the roof cross-member,
    wherein fastening of the roof cross-member to the center pillar top brace is realized by a series of first spot welds between the center pillar top brace and the window post liner and a series of second spot welds between the tongue of the window post liner and the roof cross-member.

2. The connection as claimed in claim 1, wherein the first and second determined materials are a steel with an elastic limit of 1200 MPa.

3. The connection as claimed in claim 2, wherein the third determined material is an elastic steel different from the first and second materials used.

4. The connection as claimed in claim 1, wherein the series of first spot welds between the center pillar top brace and the window post liner is produced laterally on either side of the tongue.

5. The connection as claimed in claim 4, wherein the series of second spot welds between the roof cross-member and the tongue of the window post liner is produced at a location where the tongue covers the center pillar top brace.

6. The connection as claimed in claim 1, wherein the center pillar top brace includes a recess to allow the tongue of the window post liner to be housed between the center pillar top brace and the roof cross-member.

7. The connection as claimed in claim 1, wherein the tongue extends over a top end of the center pillar top brace.

8. The connection as claimed in claim 1, wherein the window post liner includes a horizontal portion and a vertical portion each positioned on the first side of the center pillar top brace.

* * * * *